(12) United States Patent
Baird et al.

(10) Patent No.: US 8,431,280 B2
(45) Date of Patent: Apr. 30, 2013

(54) FUEL UTILISATION IN ELECTROCHEMICAL FUEL CELLS

(75) Inventors: Scott Baird, Nottingham (GB); Jeremy Stephen Matcham, West Sussex (GB); Paul Leonard Adcock, Leicestershire (GB)

(73) Assignee: Intelligent Energy Limited, Leicestershire (GB)

( * ) Notice: Subject to any disclaimer, the term of this patent is extended or adjusted under 35 U.S.C. 154(b) by 1535 days.

(21) Appl. No.: 10/557,166

(22) PCT Filed: May 6, 2004

(86) PCT No.: PCT/GB2004/001969
§ 371 (c)(1),
(2), (4) Date: Jun. 20, 2006

(87) PCT Pub. No.: WO2004/102707
PCT Pub. Date: Nov. 25, 2004

(65) Prior Publication Data
US 2006/0292429 A1      Dec. 28, 2006

(30) Foreign Application Priority Data

May 17, 2003   (GB) .................................. 0311392.5

(51) Int. Cl.
*H01M 8/04* (2006.01)
(52) U.S. Cl.
USPC ............ 429/428; 429/456; 429/512; 429/514
(58) Field of Classification Search .................. 429/428, 429/456, 512, 514
See application file for complete search history.

(56) References Cited

U.S. PATENT DOCUMENTS

| | | | |
|---|---|---|---|
| 5,935,726 A | 8/1999 | Chow et al. | |
| 6,589,678 B1 | 7/2003 | McElroy | |
| 6,663,997 B2 | 12/2003 | Dong et al. | |
| 7,044,160 B1 * | 5/2006 | Ruoff et al. ................ | 137/565.3 |
| 2003/0049503 A1 | 3/2003 | Ballantine et al. | |
| 2003/0082433 A1 | 5/2003 | Sano et al. | |
| 2003/0157392 A1 | 8/2003 | Zhang et al. | |
| 2004/0229087 A1 | 11/2004 | Senner et al. | |

(Continued)

FOREIGN PATENT DOCUMENTS

| | | |
|---|---|---|
| EP | 1 447 870 | 8/2004 |
| JP | 03-011559 | 1/1991 |

(Continued)

OTHER PUBLICATIONS

Search Report for GB0311392.5.

(Continued)

*Primary Examiner* — Jane Rhee
(74) *Attorney, Agent, or Firm* — Fish & Richardson P.C.

(57) ABSTRACT

A fuel cell assembly provides for the delivery of fluid into a channel of a fluid flow field plate in alternating flow directions through the channel for delivery of the fluid to a membrane-electrode assembly. The fuel cell includes a fluid flow field plate having a channel for delivery of fluid to a membrane-electrode assembly, the channel having a first inlet/outlet port communicating therewith and a second inlet/outlet port communicating therewith; and a fluid delivery system connected to the fluid flow field plate adapted for bi-directional delivery of fluid into the channel of the fluid flow field plate.

23 Claims, 6 Drawing Sheets

U.S. PATENT DOCUMENTS

| | | | |
|---|---|---|---|
| 2005/0048351 A1 | 3/2005 | Hood et al. |
| 2005/0106445 A1 | 5/2005 | Mitchell et al. |
| 2005/0202304 A1 | 9/2005 | Peace et al. |
| 2006/0154130 A1 | 7/2006 | Hood |
| 2006/0257699 A1 | 11/2006 | Hood et al. |
| 2007/0166596 A1 | 7/2007 | Benson |
| 2008/0145738 A1 | 6/2008 | Benson |
| 2008/0248336 A1 | 10/2008 | Matcham et al. |
| 2008/0314660 A1 | 12/2008 | Davies et al. |
| 2009/0029231 A1 | 1/2009 | Hood et al. |

FOREIGN PATENT DOCUMENTS

| | | |
|---|---|---|
| JP | 05-343082 | 12/1993 |
| JP | 2003115310 | 4/2003 |
| WO | WO02/089244 | 11/2002 |

OTHER PUBLICATIONS

Examination Report in counterpart EP Application No. 04731400.0, dated Aug. 2, 2006.

Claims as allowed in counterpart EP Application No. 04731400.0, dated Dec. 4, 2006.

Letter from Associate to the European Patent Office dated Dec. 4, 2006 in counterpart European patent application.

Written Opinion for PCT/GB2004/001969.

\* cited by examiner

FUEL UTILISATION IN ELECTROCHEMICAL FUEL CELLS

TECHNICAL FIELD

The present invention relates to fuel cells, and in particular to methods and apparatus for the delivery of fuel and oxidant to flow field plates in solid polymer electrolyte fuel cells, which flow field plates act as fluid delivery conduits to electrode surfaces of the fuel cell.

BACKGROUND

Figure 1:
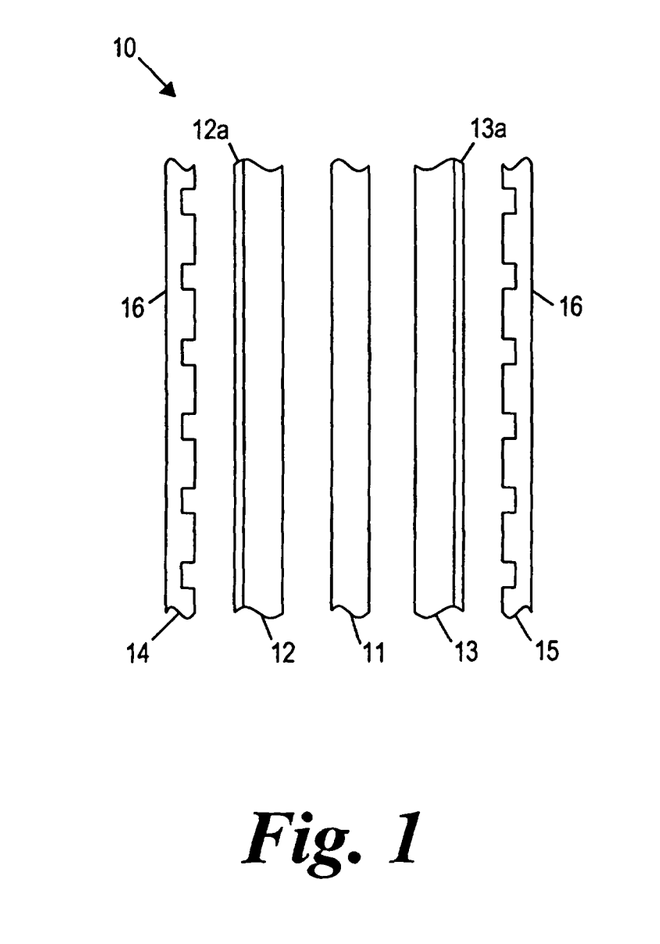
FIG. 1 is a schematic cross-sectional view through a part of a conventional fuel cell.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15 which deliver fuel and oxidant respectively to the MEA. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water. Throughout the present specification, references to the electrodes (anode and/or cathode) are intended to include electrodes with or without such a backing layer.

The fluid flow field plates 14, 15 are formed from an electrically conductive, non-porous material by which electrical contact can be made to the respective anode electrode 12 or cathode electrode 13. At the same time, the fluid flow field plates must facilitate the delivery and/or exhaust of fluid fuel, oxidant and/or reaction product to or from the porous electrodes.

This is conventionally effected by forming fluid flow passages in a surface of the fluid flow field plates, such as grooves or channels 16 in the surface presented to the porous electrodes 12, 13. Hydrogen and/or other fluid fuels or fuel mixes are delivered to the anode channels. Oxidant is delivered to the cathode channels, and reactant product water vapour is extracted from the cathode channels.

Throughout this specification, the expression "channel" will be used to indicate any suitable conduit for delivery of fluid fuel or oxidant to the MEA and/or for the exhaust of unused fuel or oxidant together with any purge or reactant products from the MEA.

Figure 2A:
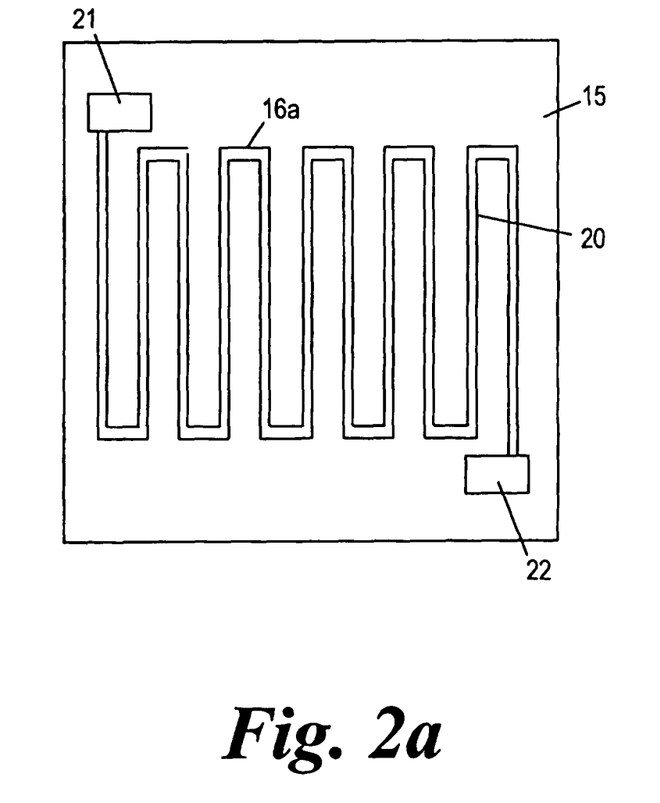
FIG. 2(a) is a simplified plan view of a fluid flow field plate of the fuel cell of FIG. 1 with an open-ended channel.

With reference also to FIG. 2(a), one conventional configuration of fluid flow channel 16a in the cathode fluid flow field plate 15 for delivery of oxidant to, and exhaust of water vapour from, the MEA is an open-ended channel having an inlet 21 and an outlet 22. This allows a continuous through-purge of gas to provide the requisite exhaust purge.

Figure 2B:
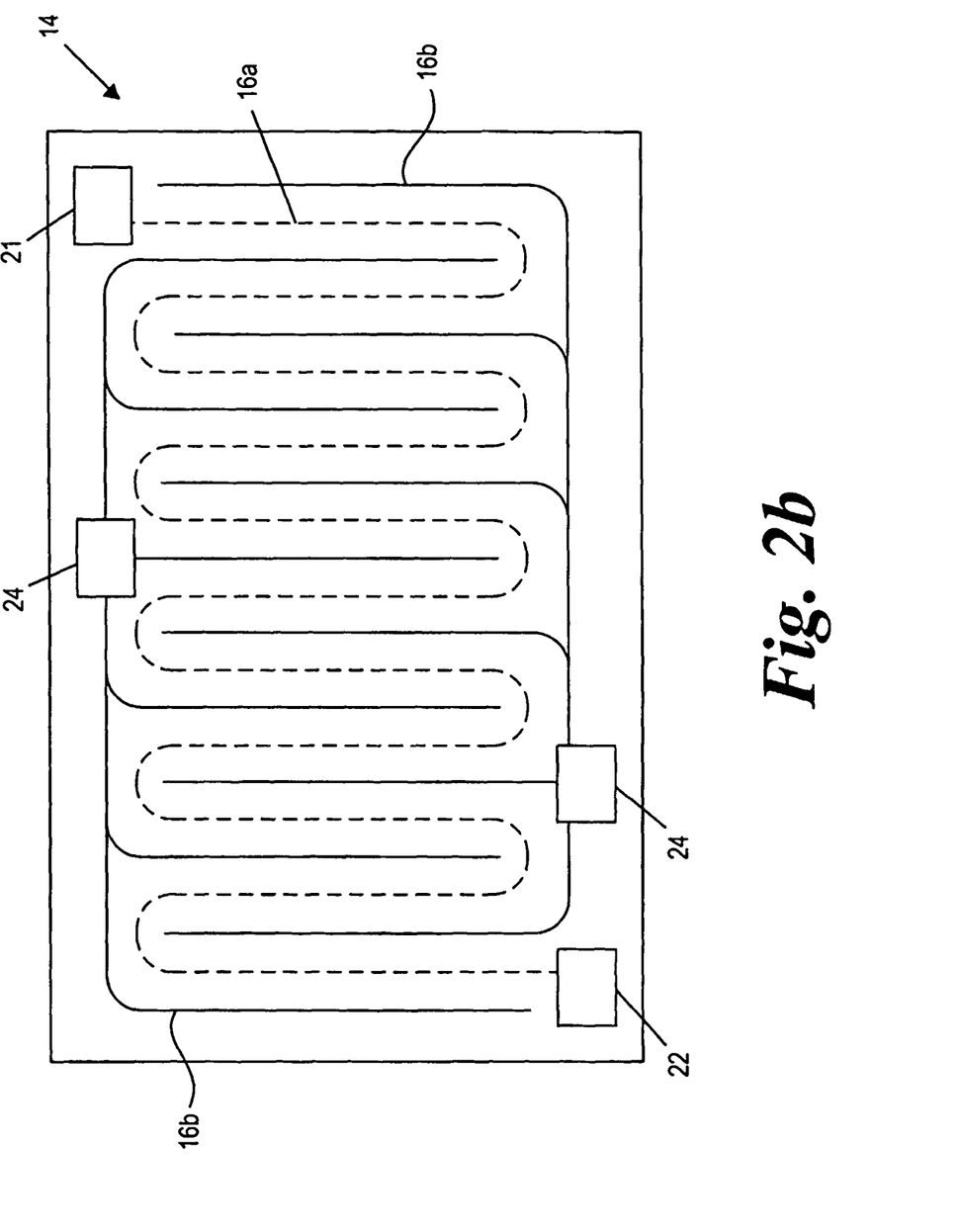
FIG. 2(b) is a simplified plan view of a fluid flow field plate of the fuel cell of FIG. 1 with closed-ended channels.

With reference also to FIG. 2(b), one conventional configuration of fluid flow channel 16b in the anode fluid flow field plate 14 for delivery of hydrogen fuel to the MEA is a "dead-ended" channel arrangement 16b, typically in a comb-like structure. Such a dead-ended channel 16b has an inlet 24, but no outlet, the hydrogen fuel being consumed as it enters the MEA from the channels 16b. As shown, two interdigitated comb structures may be used, with two inlets 24.

For simplicity, the channels 16b are shown in this diagram simply as single lines although it will be understood that they have finite width. An outline of an underlying open-ended cathode channel 16a is shown in dashed outline. The depiction of the channels 16 in the drawings is highly simplified for clarity; the channel widths and separations may both be of the order of a millimetre or so.

The dead-ended channel arrangement for the anode channels 16b suffers from at least one significant disadvantage. Although the reactant product, typically water vapour, is primarily produced on the cathode side of the MEA, and can be exhausted from the open-ended channel outlet 22, some water is typically transported back to the anode side of the MEA by diffusion. Unless managed, this water can accumulate locally and impede the access of hydrogen to the catalytically active sites for electrochemical reaction, effectively deactivating the portions of the electrode from which the hydrogen is blocked. This is sometimes referred to as 'flooding' of the anode and results in gradual but persistent performance decline in the fuel cell. A lower power output capability at any given operating voltage is the result.

In the prior art, one solution to this problem is to also use an open-ended channel 16a as the anode channel, allowing a continuous or intermittent purge of excess hydrogen to exit the fuel cell, carrying water with it to remove the water from the 'water masked' surfaces, thereby re-admitting hydrogen to the previously blocked sites.

It will be recognised that this is wasteful of hydrogen fuel which is either lost as an exhaust gas, or else it must be dehumidified and/or reconditioned so that it can be recycled to the fuel inlet. This can contribute substantially to overall system inefficiencies or complexity of fuel delivery equipment and therefore large volumes of unused purge hydrogen are undesirable.

SUMMARY

Therefore, it is an object of the present invention to increase the efficiency with which accumulated water or water vapour can be removed from the water masked surfaces of the MEA.

According to one aspect, the present invention provides a fuel cell assembly comprising:
 a fluid flow field plate having a channel for delivery of fluid to a membrane-electrode assembly, the channel having a first inlet/outlet port communicating therewith and a second inlet/outlet port communicating therewith; and
 a fluid delivery system connected to the fluid flow field plate adapted for bi-directional delivery of fluid into the channel of the fluid flow field plate.

According to another aspect, the present invention provides a method of operating a fuel cell assembly comprising the step of delivering fluid into a channel of a fluid flow field plate in alternating flow directions through the channel for delivery of the fluid to a membrane-electrode assembly.

DESCRIPTION OF THE DRAWINGS

Embodiments of the present invention will now be described by way of example and with reference to the accompanying drawings in which.

DETAILED DESCRIPTION

The present invention recognises that a major contributor to performance decline in fuel cells is 'stagnant' or trapped water which, under constant operating conditions, is not perturbed and therefore tends to realise the water masked surfaces of the MEA. Not all of this accumulated water is eliminated during conventional purge processes and an important factor in improving the efficiency of the cell is in disturbing this water layer.

The water layer can be disturbed, to allow greater hydrogen access to the MEA, by use of the gas stream itself with or without venting.

The fuel cell may be fed alternately from two or more separate inlet ports (preferably symmetrical and opposite), with or without an outlet port.

When hydrogen is fed bi-directionally from one of two (or more) alternate ports, both the hydrogen and water move in alternating directions. It has been established that this significantly reduces the effect of water accumulation and increases the utilisation of the MEA without necessarily venting of hydrogen.

Although water does accumulate, its effect in terms of masking catalyst sites in the MEA is much less due to the regular perturbation in the hydrogen flow.

This means that, even where purging is still required to remove water build up, the purge requirement is significantly reduced and the time period between purge cycles can be greatly extended. Thus hydrogen utilisation increases markedly, and fuel cell performance is consequently significantly enhanced.

Figure 3:
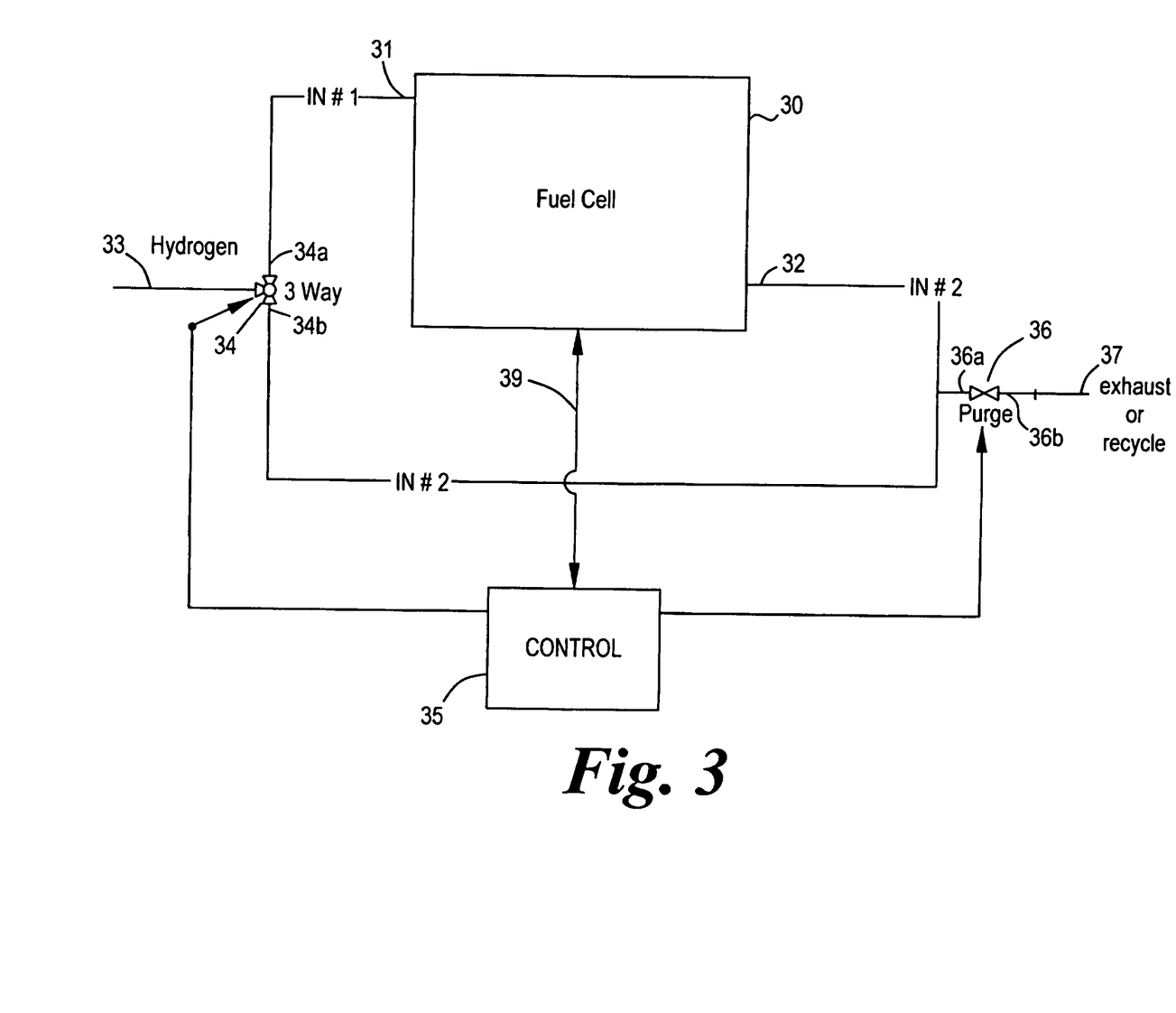
FIG. 3 is a schematic block diagram of a fuel delivery system allowing bi-directional flow of fuel through the fuel cell.

With reference to FIG. 3, an exemplary hydrogen fuel fluid delivery system provides bi-directional delivery of fluid into the anode fluid flow field plate of a fuel cell 30 by way of a first inlet/outlet port 31 and a second inlet/outlet port 32. A fluid supply line 33 provides hydrogen to the input port of a multi-way valve 34, which may particularly be of the three-way type.

A first output port 34a of the multi-way valve 34 is coupled to the first inlet/outlet port 31 of the fuel cell 30. A second output port 34b of the multi-way valve 34 is coupled to the second inlet/outlet port 32 of the fuel cell 30. The switching of the multi-way valve 34 is controlled by a controller 35, the operation of which will be described later.

A purge valve 36 has its input port 36a coupled to the second inlet/outlet port 32 of the fuel cell 30, and its output port 36b coupled to an exhaust or recycle line 37. The switching of the purge valve 36 is controlled by a controller 35, the operation of which will be described later.

In a typical fuel cell stack, a plurality of fuel cells 30 will all have their respective anode fluid flow field plates connected via a suitable manifold arrangement well known in the art, and the first and second inlet/outlet ports 31, 32 may be common to the plurality of parallel fuel cells (not shown).

During operation, the controller 35 switches the multi-way valve 34 between a first configuration in which the fluid supply line 33 is connected to the first inlet/outlet port 31 and a second configuration in which the fluid supply line 33 is connected to the second inlet/outlet port 32. Thus, by cyclically switching the valve 34 between its first and second configurations, a bi-directional flow of hydrogen (or other fuel or fuel mix) within the fuel cell 30 flow plate channels is achieved.

Preferably the switching occurs on a regular periodic basis, with a duty cycle of between 0.1 Hz and 100 Hz. More preferably, the switching occurs with a duty cycle of approximately 2.5 Hz+/−1.5 Hz.

The controller 35 also preferably switches the purge valve 36 on and off. We refer to the 'off' condition to mean that the exhaust or recycle line 37 is isolated from the second inlet/outlet port 32 and the 'on' condition to mean that the exhaust or recycle line 37 is coupled to the second inlet/outlet port 32.

Preferably the controller 35 only switches the purge valve 36 on when at least one predetermined trigger condition is sensed.

One possible trigger condition is when the fuel cell voltage has fallen to a predetermined absolute threshold level, for example approximately 0.65 V per cell. This is monitored by the controller 35, using voltage sense line 39.

Another possible trigger condition is when the fuel cell voltage has fallen by a predetermined relative or proportional amount since a previous purge cycle, for example approximately 0.3% of the cell or fuel cell stack voltage.

Another possible trigger condition is upon expiry of a predetermined time period.

The controller 35 switches the purge valve 36 on when the multi-way valve 34 is in the first configuration so that the first inlet/outlet port 31 is acting as a fuel inlet and the second inlet/outlet port 32 is acting as an outlet, thereby ensuring an efficient purge mechanism. Thus, this may constitute a further trigger condition that can be used in conjunction with other trigger conditions, eg. on a Boolean 'and' basis.

In this case, the control means 35 may also be operative to ensure that the purge valve 36 operation is controlled such that when the purge is required, its 'on' cycle is coextensive with, or shorter than, the duration that the multi-way valve 34 is in the first configuration. The required duration of a purge cycle could be greater than the duty cycle of the multi-way valve 34, in which case the purge valve may operate for several successive cycles of the multi-way valve 34, when it is in the first configuration.

Figure 4:
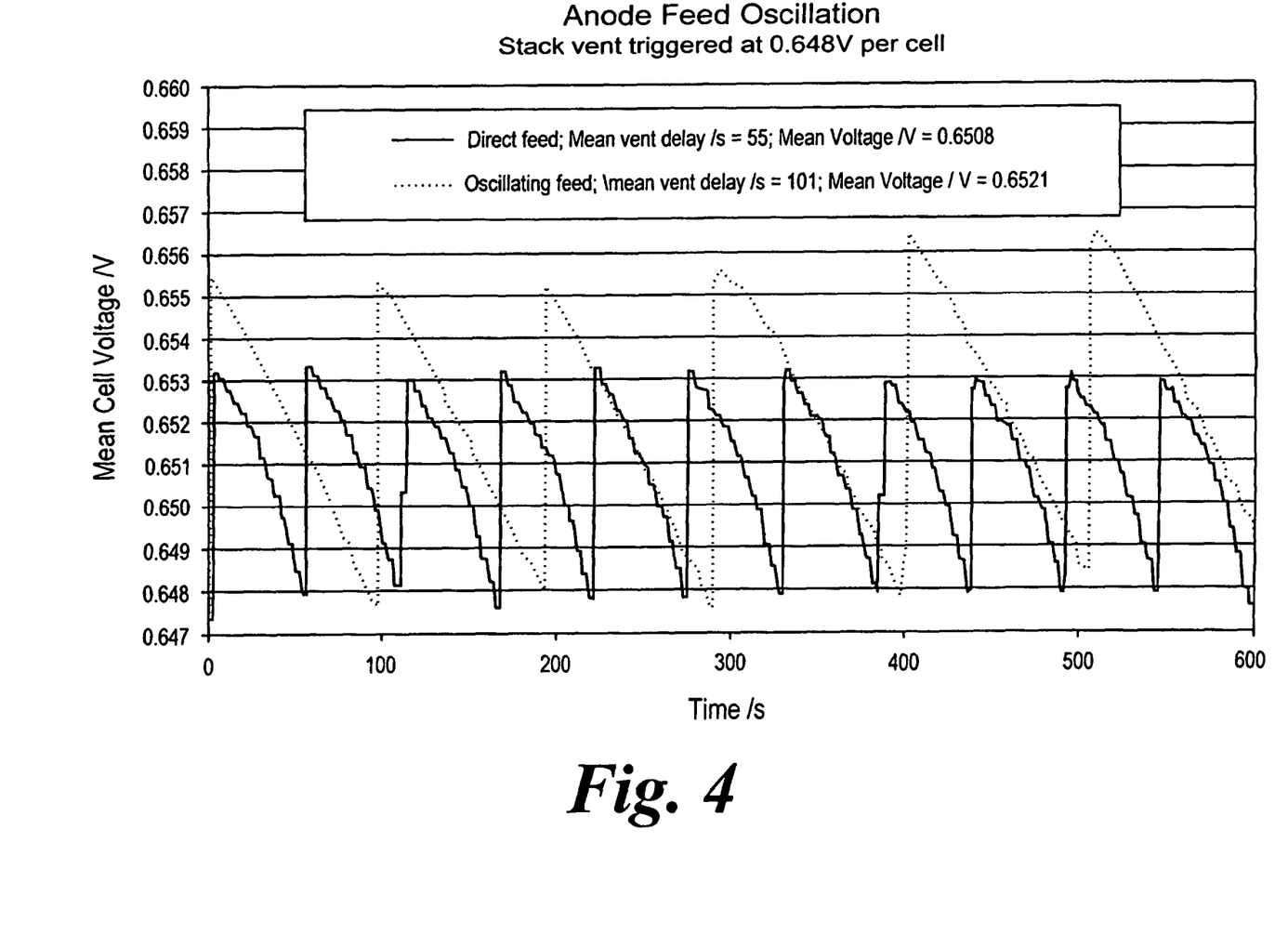
FIG. 4 is a graph illustrating the improved performance of a fuel cell operated with bi-directional fuel feed and an absolute cell voltage purge trigger.

Referring now to FIG. 4, the graph illustrates the effects of operating a fuel cell such that the multi-way valve 34 is toggled between the first and second configurations with a duty cycle of 1 Hz (ie. an "oscillating, bi-directional feed" at 1 Hz); and the purge valve 36 is switched on to vent to exhaust upon sensing a trigger condition of 0.648 V cell voltage. This is contrasted with the performance of the same cell operated with a "direct feed", in which the multi-way valve 34 is held permanently in the first configuration, and again with a vent triggered at 0.648 V per cell, under the same load conditions.

It can readily be seen that the mean time of 55 seconds between vent cycles for the direct feed is extended to a mean time of 101 seconds between vent cycles for the oscillating, bi-directional feed, also providing a slightly increased mean voltage from 0.6508 V to 0.6521 V. It will be understood that an increased interval between purge cycles necessarily results in a decreased loss of hydrogen to the purge exhaust and an increase in fuel cell efficiency.

Figure 5:
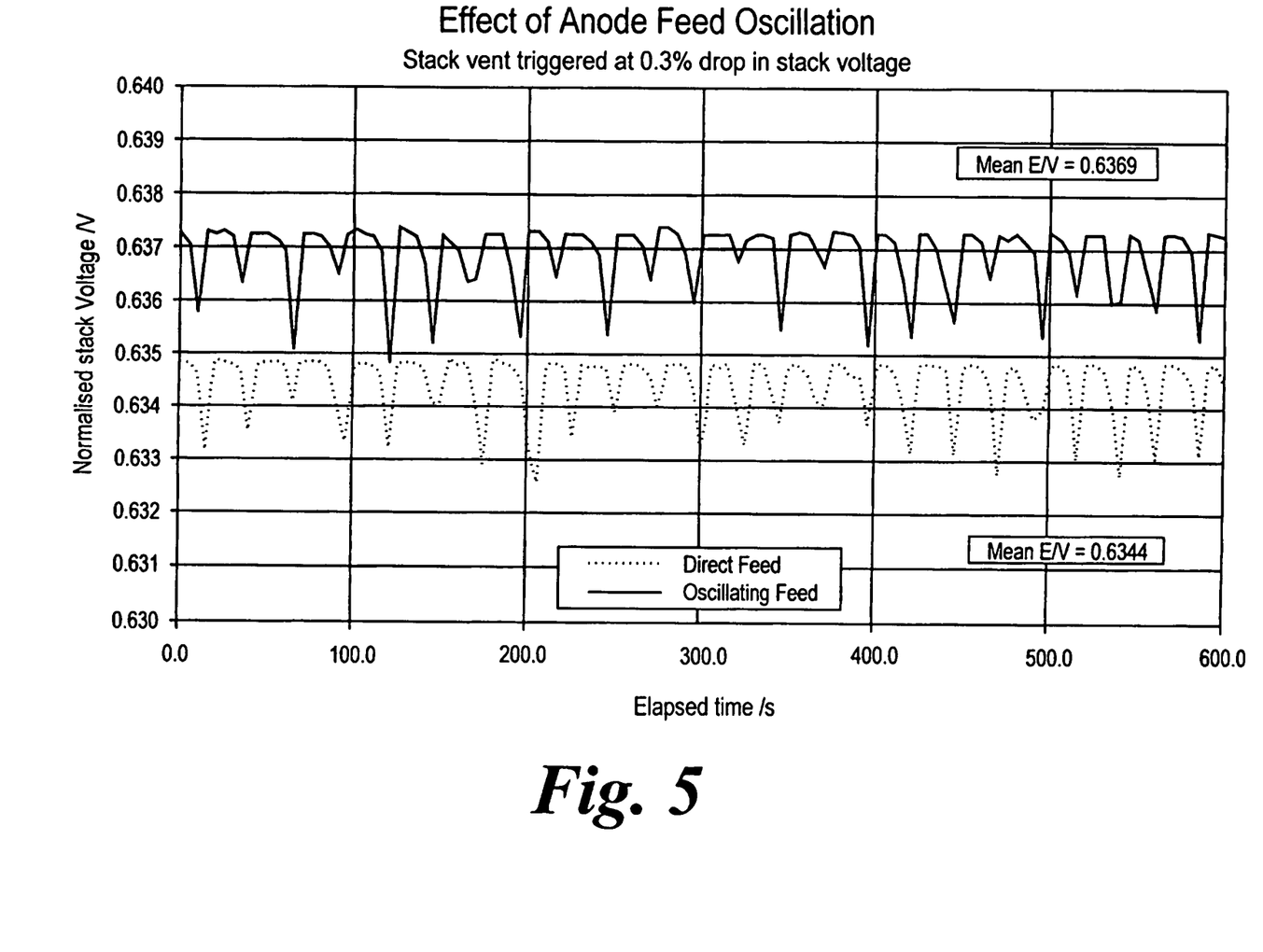
FIG. 5 is a graph illustrating the improved performance of a fuel cell operated with bi-directional fuel feed and a proportionate decline cell voltage purge trigger.

Referring now to FIG. 5, the graph illustrates the effects of operating a fuel cell such that the multi-way valve 34 is toggled between the first and second configurations with a duty cycle of 1 Hz (ie. an "oscillating, bi-directional feed" at 1 Hz); and the purge valve 36 is switched on to vent to exhaust upon sensing a trigger condition indicated by a proportionate fall in stack voltage of about 0.3%.

This is contrasted with the performance of the same cell operated with a "direct feed", in which the multi-way valve 34 is held in the first configuration, and again with a vent triggered at 0.3% voltage drop.

It can readily be seen that although the period between vent cycles is substantially the same for the direct feed and for the oscillating feed, the oscillating, bi-directional feed provides a higher mean and absolute voltage level taking the mean cell voltage from 0.6344 V to 0.6369 V and therefore a higher fuel cell efficiency.

Although described in the context of hydrogen as a fluid fuel, and oxygen as a fluid oxidant, delivery of other fuel streams, including hydrogen rich gas streams, such as hydrogen with $CO_2$ or $N_2$ or fuel streams with or without additional purge gases or humidification may benefit from the oscillating bi-directional fuel feed. Similarly, delivery of oxidant may include air, or oxidant in any proportion with diluent or inert gases or as the sole fluid.

Although the preferred embodiments have been described in the context of displacing water from the catalytic sites of the anode side of the MEA, by way of a bi-directional fuel feed, it will be understood that for optimum efficiency, it may be desirable to provide a similar displacement mechanism to the cathode side of the MEA, such that oxidant, with or without additional purge gases, is fed into the cathode fluid flow plate channel in a bi-directional mode.

Figure 6:
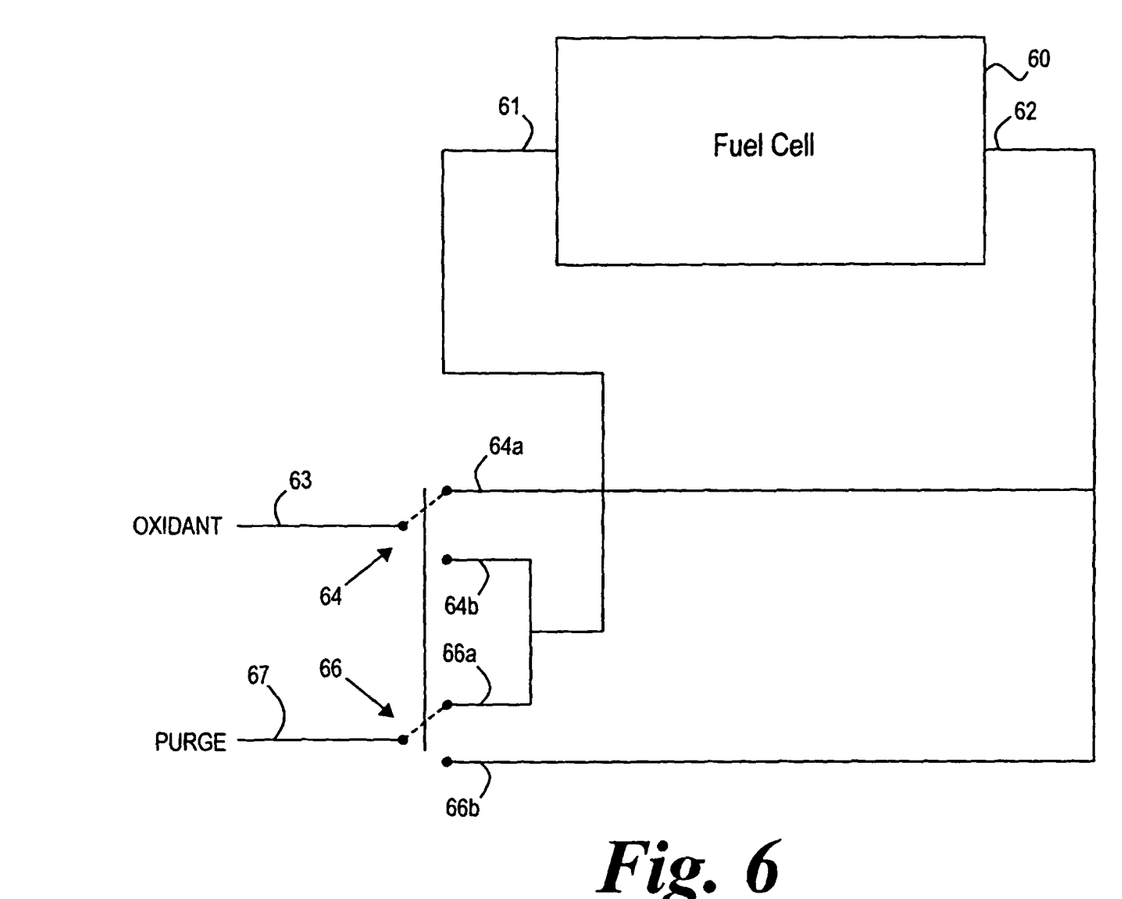
FIG. 6 is a schematic block diagram of an oxidant delivery and purge system allowing bi-directional flow of oxidant and exhaust gases through the fuel cell.

With reference to FIG. 6, an alternative fuel cell assembly provides an oscillating, bi-directional fluid feed of, for example oxidant and purge through the fluid flow channels of fuel cell 60. The fuel cell 60 has a first inlet/outlet port 62 and a second inlet/outlet port 61 which are both coupled to first and second outputs of a two-gang multi-way valve.

The two-gang multi-way valve effectively comprises a first valve 64 and a second valve 66 that operate in concert with one another. The first valve 64 has an input connected to a fluid source 63 (eg. oxidant), a first output 64a connected to the first inlet/outlet port 62 and a second output connected to the second inlet/outlet port 61. The second valve 66 has an input connected to a purge line 67, a first output 66a connected to the second inlet/outlet port 61 and a second output 66b connected to the first inlet/outlet port 62.

The valves 64 and 66 are configured so that only the first outputs 64a, 66a or the second outputs 64b, 66b can be switched to the respective valve inputs at any one time.

In this manner, a bi-directional flow of fluid and exhaust can be maintained within the fuel cell 60 at all times. In the preferred arrangement, the fluid supply 63 is oxidant (with or without additional carrier/purge/inert gases) that is delivered to the cathode fluid flow field plate. However, it will be recognised that this arrangement can also be used for delivery of fuel such as hydrogen to the anode fluid flow field plate if a permanent exhaust or recycle connection is required. In this way, a reduced purge flow may be utilised due to the greater efficiency in displacing water from the MEA by the bi-directional flows.

While the examples of the invention have illustrated use of a dual port fuel cell 30, 60, it will be understood that more than two ports can be used to effect oscillating, multi-directional fluid flow through the channel or channels of the fluid flow field plates. Alternatively, the ports used for venting need not necessarily be combined with the ports used as inlets, but could be provided separately, for example at one or more positions intermediate a pair of alternating inlet ports.

Other embodiments are intentionally within the scope of the appended claims.

The invention claimed is:

1. A fuel cell assembly comprising:
a fluid flow field plate comprising a channel for delivery of fluid to a membrane-electrode assembly, the channel comprising a first inlet/outlet port for fluid communication therewith and a second inlet/outlet port for fluid communication therewith;
a fluid delivery system connected to the fluid flow field plate and configured for bi-directional delivery of fluid into the channel of the fluid flow field plate, the fluid delivery system comprising a multi-way valve coupled to the first inlet/outlet port, to the second inlet/outlet port, and to a fluid source, the multi-way valve being switchable into a first configuration in which the fluid source is coupled to the first inlet/outlet port thereby providing fluid in a first direction and into a second configuration in which the fluid source is coupled to the second inlet/outlet port thereby providing fluid in a second direction that is different from the first direction; and
a controller configured to periodically switch the multi-way valve between the first configuration and the second configuration;
wherein the controller is configured to switch the multi-way valve at a duty cycle of between 0.1 Hz and 100 Hz.

2. The fuel cell assembly of claim 1, wherein the controller is configured to switch the multi-way valve at a duty cycle of 2.5 Hz+/−1.5 Hz.

3. The fuel cell assembly of claim 1, further comprising a purge valve coupled to the second inlet/outlet port.

4. The fuel cell assembly of claim 3, wherein the controller is configured to periodically switch the purge valve on only at times when the multi-way valve is in the first configuration.

5. The fuel cell assembly of claim 3, wherein the controller is configured to switch the purge valve in response to sensing of at least one predetermined trigger condition.

6. The fuel cell assembly of claim 5, wherein the at least one predetermined trigger condition comprises that an output voltage of a fuel cell associated with the fuel cell assembly has fallen below a predetermined threshold.

7. The fuel cell assembly of claim 5, wherein the at least one predetermined trigger condition comprises that an output voltage of a fuel cell associated with the fuel cell assembly has fallen by a predetermined percentage since a previous purge cycle.

8. The fuel cell assembly of claim 5, wherein the at least one predetermined trigger condition is provided by an elapsed time counter.

9. The fuel cell assembly of claim 5, wherein the controller is configured to switch the purge valve on for a predetermined period of time after sensing the at least one predetermined trigger condition.

10. The fuel cell assembly of claim 9, wherein the predetermined period of time is co-extensive with a duration that the multi-way valve is in the first configuration.

11. The fuel cell assembly of claim 1, wherein the fluid flow field plate comprises an anode fluid flow field plate.

12. The fuel cell assembly of claim 11, wherein the fluid delivery system is configured to deliver hydrogen to the fluid flow field plate.

13. The fuel cell assembly of claim 1, wherein the fluid flow field plate comprises a cathode fluid flow field plate.

14. The fuel cell assembly of claim 13, wherein the fluid delivery system is configured to deliver oxygen to the fluid flow field plate.

15. A method of operating a fuel cell assembly comprising:
   (i) a fluid flow field plate comprising a channel for delivery of fluid to a membrane-electrode assembly, the channel comprising a first inlet/outlet port for fluid communication therewith and a second inlet/outlet port for fluid communication therewith; and
   (ii) a fluid delivery system connected to the fluid flow field plate and configured for bi-directional delivery of fluid into the channel of the fluid flow field plate, the fluid delivery system comprising a multi-way valve coupled to the first inlet/outlet port, to the second inlet/outlet port, and to a fluid source, the multi-way valve being switchable into a first configuration in which the fluid source is coupled to the first inlet/outlet port thereby providing fluid in a first direction and into a second configuration in which the fluid source is coupled to the second inlet/outlet port thereby providing fluid in a second direction that is different from the first direction;

the method comprising:
   periodically switching the multi-way valve between the first configuration and the second configuration;
   wherein the multi-way valve is switched at a duty cycle of between 0.1 Hz and 100 Hz.

16. The method of claim 15, further comprising periodically providing a purging fluid flow through the channel in at least one flow direction.

17. The method of claim 16, wherein the purging fluid flow is provided only when at least one predetermined trigger condition is sensed.

18. The method of claim 17, wherein the at least one predetermined trigger condition comprises that an output voltage of a fuel cell associated with the fuel cell assembly has fallen below a predetermined threshold.

19. The method of claim 17, wherein the at least one predetermined trigger condition comprises that an output voltage of a fuel cell associated with the fuel cell assembly has fallen by a predetermined percentage since a previous purge cycle.

20. The method of claim 15, wherein the fluid being delivered comprises fuel.

21. The method of claim 20, wherein the fuel comprises hydrogen.

22. The method of claim 15, wherein the fluid being delivered comprises oxidant.

23. The method of claim 15, wherein the multi-wave valve is switched at a duty cycle of 2.5 Hz+/−1.5 Hz.

* * * * *

UNITED STATES PATENT AND TRADEMARK OFFICE
CERTIFICATE OF CORRECTION

PATENT NO. : 8,431,280 B2
APPLICATION NO. : 10/557166
DATED : April 30, 2013
INVENTOR(S) : Baird et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1883 days.

Signed and Sealed this
Eighth Day of September, 2015

Michelle K. Lee
*Director of the United States Patent and Trademark Office*